(12) United States Patent
Kondo

(10) Patent No.: US 6,796,781 B2
(45) Date of Patent: Sep. 28, 2004

(54) WATERPROOF APPARATUS FOR TERMINAL CONNECTING PORTION OF SHEATHED WIRE

(75) Inventor: Masayuki Kondo, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/732,788

(22) Filed: Dec. 11, 2000

(65) Prior Publication Data

US 2001/0003591 A1 Jun. 14, 2001

(30) Foreign Application Priority Data

Dec. 9, 1999 (JP) .................................... P.11-350666

(51) Int. Cl.[7] .............................................. B29C 33/42
(52) U.S. Cl. ................ 425/116; 425/542; 425/436 RM; 425/470; 249/95
(58) Field of Search .................................. 425/116, 117, 425/108, 542, 470, 436 R, 436 RM; 249/91, 93, 94, 95; 264/275

(56) References Cited

U.S. PATENT DOCUMENTS

| | | | | |
|---|---|---|---|---|
| 3,142,716 A | * | 7/1964 | Gardener ............... | 264/272.15 |
| 4,043,027 A | * | 8/1977 | Birchler et al. ........ | 264/272.17 |
| 4,204,896 A | * | 5/1980 | Richardson ............. | 425/108 |
| 4,250,347 A | * | 2/1981 | Fierkens ............... | 264/272.17 |
| 4,405,083 A | * | 9/1983 | Charlebois et al. ..... | 249/97 |
| 4,592,131 A | * | 6/1986 | Deie ................... | 264/272.12 |
| 5,262,115 A | * | 11/1993 | Tomlinson ............. | 425/116 |
| 5,407,340 A | * | 4/1995 | Daguet et al. ......... | 425/116 |
| 5,620,338 A | * | 4/1997 | Stephens et al. ....... | 439/522 |
| 5,620,711 A | * | 4/1997 | Saito ................. | 425/116 |
| 5,759,052 A | * | 6/1998 | Seki .................. | 439/189 |

FOREIGN PATENT DOCUMENTS

| | | | | |
|---|---|---|---|---|
| JP | 10-289745 | 10/1998 | ............ | H01R/11/12 |
| JP | 11-120986 | 4/1999 | ............ | H01M/2/30 |

OTHER PUBLICATIONS

David et al, Applied Plastic Production Design, 1946, Prentice—Hall, Inc., 74*

* cited by examiner

*Primary Examiner*—Robert Davis
*Assistant Examiner*—Thu Khanh T. Nguyen
(74) *Attorney, Agent, or Firm*—Sughrue Mion, PLLC

(57) ABSTRACT

An apparatus in which a pair of hollow molding portions 53 and 54 for molding in which a terminal connecting portion with a terminal fitting 20 crimped onto a conductor 11 at a tip portion of a sheathed wire 10 is accommodated and set are provided inside a mold 50 made up by an upper mold 51 and a lower mold 52, a molding resin 30 in a molten state being injected and poured into the molding portions 53 and 54 to cover and mold the terminal connecting portion so as to provide waterproofing, the terminal connecting portion subjected to covering and molding being released from the mold so as to be removed outside the mold. A casting surface of the molding portion 53 of the upper mold 51 is provided with a gradient or a curvature for facilitating the release of the terminal connecting portion subjected to covering and molding from the mold, whereby the terminal connecting portion subjected to covering and molding remains in the molding portion 54 of the lower mold 52 during mold releasing.

2 Claims, 4 Drawing Sheets

WATERPROOF APPARATUS FOR TERMINAL CONNECTING PORTION OF SHEATHED WIRE

BACKGROUND OF THE INVENTION

The present invention relates to a waterproofing apparatus for a terminal connecting portion of a sheathed wire for providing waterproofing by resin molding.

In general, in the case of a sheathed wire, a tip portion of its sheath is stripped off to expose a conductor, and the conductor is connected to an electric component or device through a terminal fitting crimped onto the bared conductor by caulking or the like. If the bared conductor after crimping is left as it is, trouble can occur in which water can be transmitted to and permeate the sheathed wire, and can possibly enter the interior of the sheathed wire through the capillary phenomenon. To prevent this, the terminal connecting portion including the bare conductor is protected by various covering members to provide waterproofing.

For example, a terminal fitting for grounding disclosed in Japanese Patent Publication No. 10-289745A provides waterproofing by covering the bare conductor of the terminal connecting portion with a heat-shrinkable tube and by heating and fusing the tube. In addition, as in the case of a connection plate for a battery holder disclosed in Japanese Patent Publication No. 11-120986A, a technology is also known in which, in the wiring for power supply cells of an electric vehicle, a terminal connecting portion with a terminal fitting crimped to a bare conductor is covered and protected by a molding resin to provide waterproofing.

FIGS. 4A and 4B are front cross-sectional views schematically illustrating states persisting before and after mold releasing is effected after allowing a molding resin to cool and cure subsequent to its injection in a mold which makes up essential portions of a resin-molding waterproofing apparatus, so as to conceptually explain the aforementioned latter related resin-molding waterproofing apparatus.

In the case of a bare wire 1 serving as a workpiece to be molded, a terminal connecting portion is formed in advance in preparation for molding by exposing a conductor 2 with a tip portion of its sheath stripped off and by crimping a caulking portion 3 of a terminal fitting onto the bared conductor 2 by caulking or the like.

A mold 4 is comprised of an upper mold 5 and a lower mold 6, and molding portions 7 and 8 are respectively provided inside the upper and lower molds 5 and 6 as molding cavities in which the aforementioned terminal connecting portion is set. A molten molding resin 9 is poured through a runner channel of an injection gate, and is fused onto the terminal connecting portion in such a manner as to cover substantially the entire portion of the terminal connecting portion. After the cooling and curing of the molding resin 9, the upper and lower molds 5 and 6 are relatively operated to release from the mold the terminal connecting portion for which waterproofing by molding has been completed, as shown in FIG. 4B.

In the related resin-molding waterproofing apparatus shown in FIGS. 4A and 4B, the entire terminal connecting portion for which waterproofing has been completed by fusing the molding resin 9 onto it is lifted off together with the upper mold 2 during the mold releasing shown in FIG. 4B. To remove such a terminal connecting portion from the upper mold 2, an operator must look up at the terminal connecting portion from a lower direction and is therefore bound to assume an unnatural posture. In mass production, the physical burden increases, and has constituted a cause for lowering the efficiency in the molding operation.

SUMMARY OF THE INVENTION

Accordingly, an object of the invention is to provide a waterproofing apparatus for a terminal connecting portion of a sheathed wire which enhances the efficiency of the molding operation by making it possible to allow the terminal connecting portion after molding to be released from the mold in a satisfactory state when the terminal connecting portion formed with a terminal fitting crimped onto the conductor at the tip portion of the sheathed wire is provided with waterproofing by being molded and covered with a resin in the mold.

In order to achieve the above object, according to the present invention, there is provided an apparatus for waterproofing a terminal connecting portion of a sheathed wire, in which a terminal fitting and a bared conductor of the sheathed wire are connected with each other, by molding with resin, the apparatus comprising:

an upper mold having an inner space provided with a dome-like ceiling face, which defines an upper part of a molding cavity in which the terminal connecting portion of the sheathed wire is accommodated and molten resin is injected therein; and a lower mold having an inner space provided with vertical side faces and a bottom face, which defines a lower part of the molding cavity.

Preferably, the dome-like ceiling face of the upper mold has a curvature so selected as to be coincident with a curvature of an outer face of the terminal fitting.

By virtue of the above-described arrangement, the molding portion of the upper mold provided on the mating surface of the lower mold is provided with a gradient or a curvature for facilitating mold releasing. A molding resin in a molten state is injected and poured into the cavities of the molding portions of the upper and lower molds so as to cover the terminal connecting portion. When effecting mold releasing after the cooling and curing of the molding resin, the molding portion of the upper mold can be easily released from the terminal connecting portion subjected to covering and molding, and the terminal connecting portion remains in the molding portion of the lower mold. The terminal connecting portion subjected to covering and molding which remained in the lower mold can be removed with a natural operating posture.

DETAILED DESCRIPTION OF THE PREFERRED EMBODIMENTS

Figure 1:
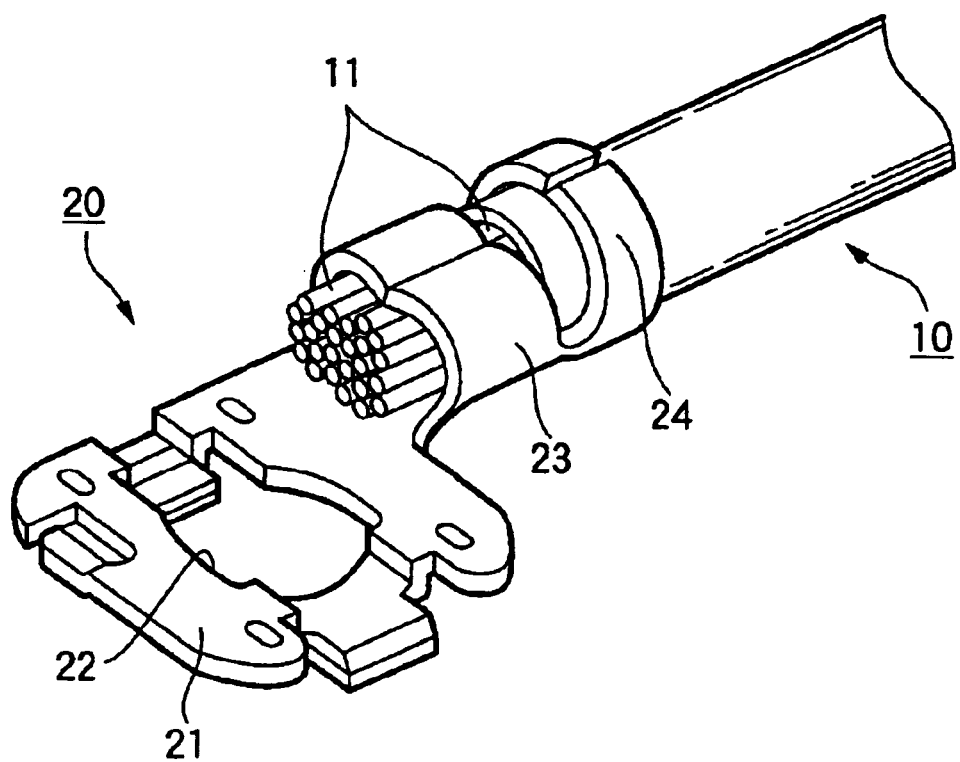
FIG. 1 is an external perspective view illustrating a state persisting before waterproofing a terminal connecting portion of a sheathed wire with a molding resin, according to one embodiment of the invention.

Referring now to the drawings, a detailed description will be given of one embodiment of the waterproofing apparatus for a terminal connecting portion of a sheathed wire in accordance with the invention.

Figure 3:
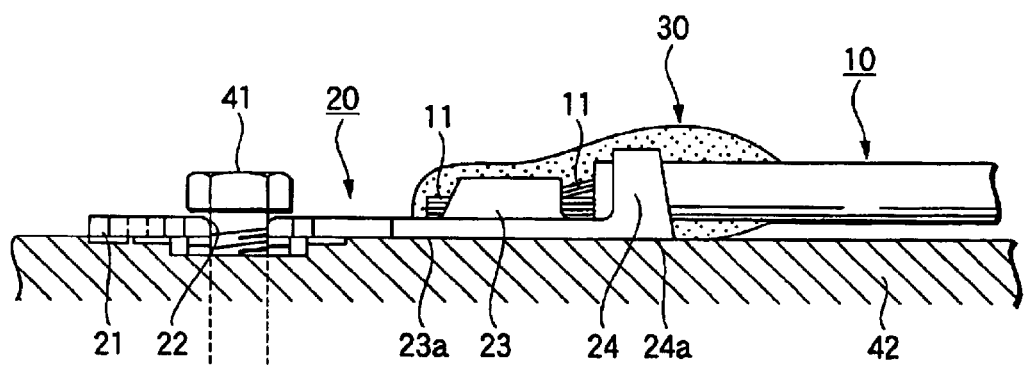
FIG. 3 is a side view, partly in section, illustrating a state in which the terminal connecting portion, subjected to waterproofing by being covered and molded with a resin, is connected to a vehicle body as a grounding wire.
Figure 4A:
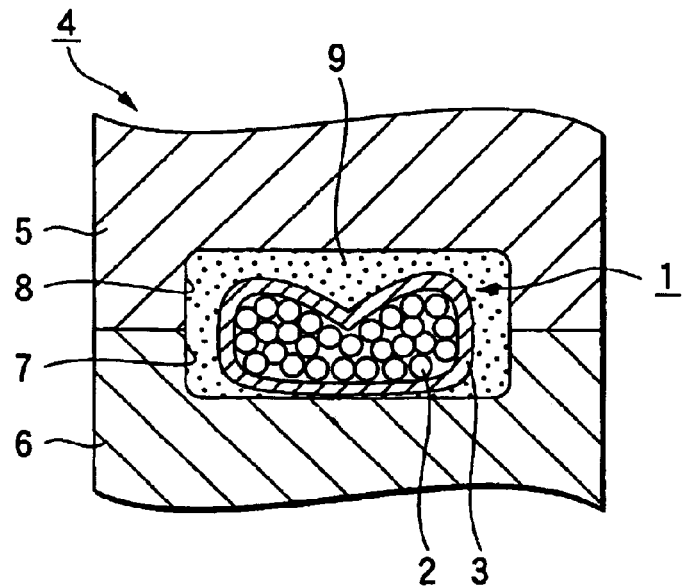
FIG. 4A is a vertical cross-sectional view illustrating a related art in which a molten resin is injected into upper and lower molds to cover and mold a terminal connecting portion.
Figure 4B:
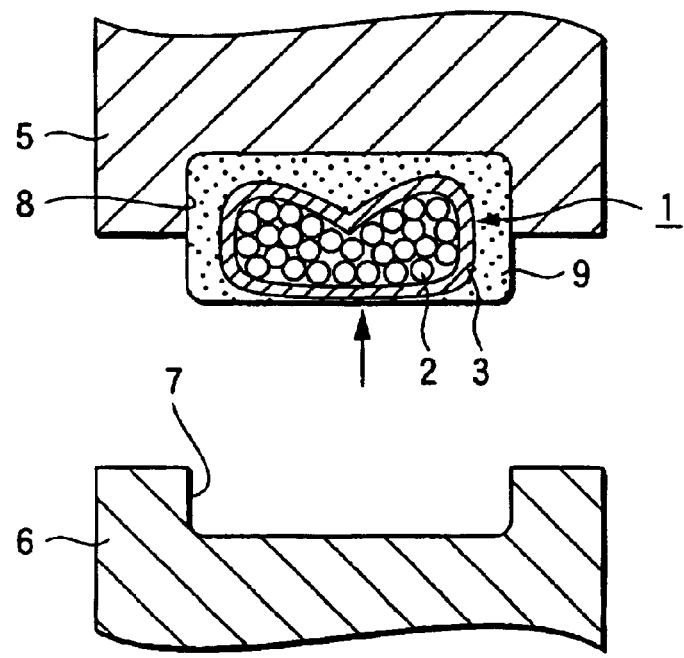
FIG. 4B is a vertical cross-sectional view illustrating a the related art in which the covered and molded terminal connecting portion is lifted up by being attached to the upper mold during mold releasing after resin curing.

FIG. 1 is a perspective view illustrating the terminal connecting portion prior to waterproofing in which a terminal fitting 20 has been caulked and crimped onto a bare conductor 11 exposed by stripping off a tip portion of a sheath of a sheathed wire 10. As for the terminal fitting 20, a central portion of a flat connecting portion 21 at its tip portion is formed as an opening 22, and the sheathed wire 10 is used as a grounding wire by being connected to a vehicle body 42 or the like by inserting a bolt 41 in the opening 22, as shown in FIG. 3 which illustrates a state after waterproofing. In addition, a rear portion of the connecting portion 21 is provided with caulking portions 24 which are caulked and crimped onto the bare conductor 11.

Figure 2A:
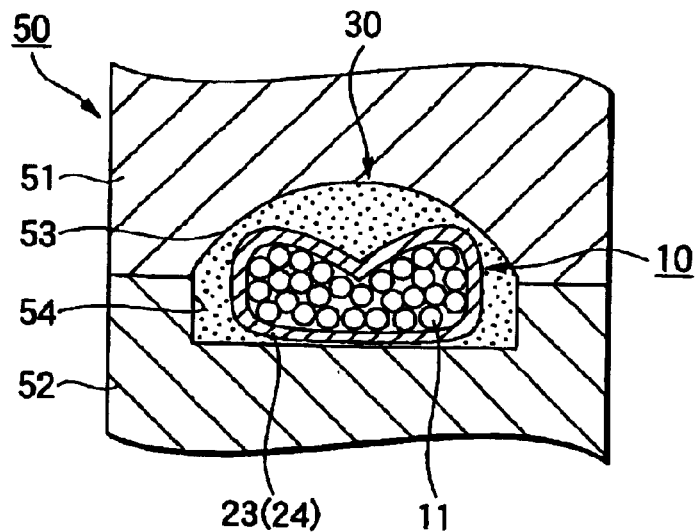
FIG. 2A is a vertical cross-sectional view illustrating a state in which a molten resin is injected into upper and lower molds to cover and mold the terminal connecting portion.
Figure 2B:
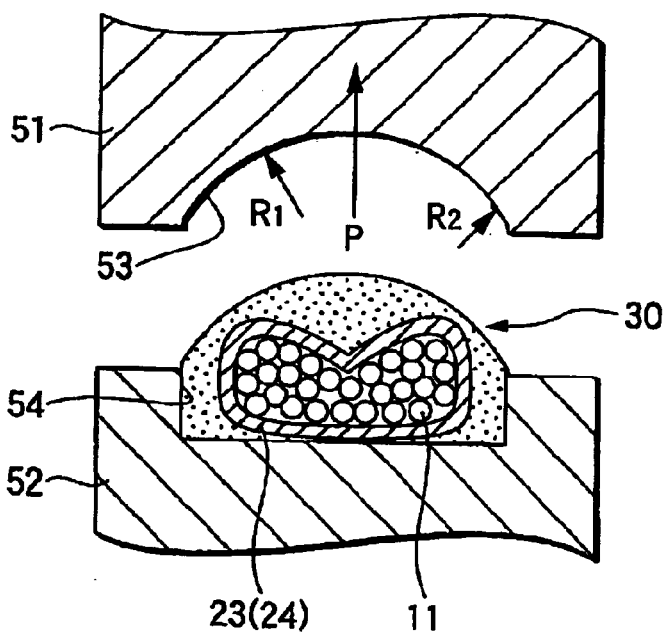
FIG. 2B is a vertical cross-sectional view illustrating a state in which the upper mold is smoothly released from the covered and molded terminal connecting portion at the time of mold releasing after resin curing.

FIGS. 2A and 2B are front cross-sectional views illustrating states persisting before and after mold releasing is effected after allowing a molding resin to cool and cure subsequent to its injection in a mold 50 making up essential portions of a resin-molding waterproofing apparatus in which the above-described terminal connecting portion is set to provide waterproofing.

The mold 50 is comprised of an upper mold 51, a lower mold 52, and the like, and molding portions 53 and 54 are respectively provided inside the upper and lower molds 51 and 52 as molding cavities in which the aforementioned terminal connecting portion is set. A molding resin 30 in a molten state is poured through a runner channel of an injection gate, and is fused onto the terminal connecting portion in such a manner as to cover substantially the entire portion of the terminal connecting portion.

In the upper mold 51 in this embodiment, the cross-sectional shape of its molding portion 53 is formed as shown in FIG. 2B. Namely, it is configured that the upper mold 51 is formed with a dome-like ceiling inner face having a predetermined curvature. In this embodiment, the ceiling face has two curvatures $R_1$ and $R_2$ (here, $R_1 < R_2$). These curvatures so selected as to be substantially coincident with those of an outer face of the caulking terminal fitting 23 or 24. Thus, the number of values or the large-small relationship of the curvatures is not limited to the present embodiment.

In contrast, in the lower mold 52 in this embodiment, the cross-sectional shape of its molding portion 54 is formed in the cross-sectional shape of a rectangular U-shaped groove, such that an appropriate frictional force can be obtained between the vertical wall surface on each side of the groove in the drawing and the casting surface of the molding resin 30 after cooling and curing.

By using the above-described mold structure, as shown in FIG. 2A, a predetermined amount of molding resin 30 in a molten state is injected and poured into the molding portions 53 and 54 inside the mold. Subsequently, after the molding resin 30 is cooled and cured inside the molding portions 53 and 54, the upper and lower molds 51 and 52 are relatively moved in mutually opposing directions, i.e., the upper 51 is raised in the upward direction P in this case. The upper portion of the terminal connecting portion, for which waterproofing has been completed by covering and molding with the molding resin 30, is molded in a curved projecting shape, and the upper mold 51 is smoothly released from the projecting upper portion by virtue of its mold-releasing curvatures $R_1$ and $R_2$.

In the lower mold 52, the terminal connecting portion is retained in the molding portion 54 by virtue of an appropriate frictional force acting between the groove wall surface on each side of the molding portion 54 and the casting surface on each side of the covering resin 30 of the terminal connecting portion after molding.

Since the operator is able to release and remove the molded terminal connecting portion thus retained in the lower mold 52 from the molding portion 54 without difficulty with a natural posture, the molding operation improves.

Since the curvature of the dome-like ceiling face of the upper mold 51 is so selected as to be coincident with that of the outer face of the caulking terminal fitting 23 or 24, the thickness of molded resin is made substantially identical for all over the body of the molded terminal connecting portion. Thereby the contraction coefficient or the thermal expansivity of the molded resin is also made substantially identical for all over the body of the molded terminal connecting portion. Therefore, reliable waterproofing property can be attained.

FIG. 3 illustrates a form in which the sheathed wire 10 is used as a grounding wire as the terminal connecting portion subjected to waterproofing by being covered and molded with the molding resin 30 is connected to the vehicle body 42 at the connecting portion 21 at the tip of the terminal fitting 20 by means of the bolt 41.

As described above, since the molding portion 53 of the upper mold 51 provided on the mating surface of the lower mold 52 is provided with a gradient or a curvature for facilitating mold releasing. As a result, when a molding resin 30 in a molten state is injected and poured into the cavities of the molding portions 53 and 54 of the upper and lower molds 51 and 52 so as to cover the terminal connecting portion, and mold releasing is effected after the cooling and curing of the molding resin 30, the molding portion 53 of the upper mold 51 can be easily released from the terminal connecting portion subjected to covering and molding, and the terminal connecting portion remains in the molding portion 54 of the lower mold 52. Therefore, the terminal connecting portion subjected to covering and molding can be removed with a natural operating posture, the operating burden can be alleviated, and the efficiency of the molding operation can be effectively improved.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A system for providing a waterproof terminal connecting portion of a sheathed wire, comprising:

a terminal fitting connected to a bared conductor of the sheathed wire at a first part of the sheathed wire, wherein the terminal fitting includes an upper face having a curvature;

an upper mold having an inner space provided with a dome-shaped ceiling face, which defines an upper part of a molding cavity in which the first part of the sheathed wire is accommodated and molten resin covering a part of the terminal fitting is injected therein; and a lower mold having an inner space which defines a lower part of the molding cavity, wherein a curvature of the dome-shaped ceiling face is made coincident with the curvature of the upper face of the terminal fitting so that a thickness of the molten resin between the ceiling face and the upper face of the terminal fitting is substantially identical.

2. The system as set forth in claim 1, wherein the dome-shaped ceiling face comprises at least two radii of curvature in an identical cross-sectional plane, in accordance with a shape of an outer face of the terminal fitting.

* * * * *